(12) United States Patent
Iwan et al.

(10) Patent No.: US 8,538,734 B2
(45) Date of Patent: Sep. 17, 2013

(54) EXTREME EVENT PERFORMANCE EVALUATION USING REAL-TIME HYSTERESIS MONITORING

(75) Inventors: Wilfred D. Iwan, Sierra Madre, CA (US); Dan Constantin Radulescu, Tujunga, CA (US); Costin Radulescu, Tarzana, CA (US)

(73) Assignees: California Institute of Technology, Pasadena, CA (US); Digitex Data Systems, Corp., Pasadena, CA (US)

( * ) Notice: Subject to any disclaimer, the term of this patent is extended or adjusted under 35 U.S.C. 154(b) by 1226 days.

(21) Appl. No.: 11/040,072

(22) Filed: Jan. 21, 2005

(65) Prior Publication Data

US 2005/0165588 A1    Jul. 28, 2005

Related U.S. Application Data

(60) Provisional application No. 60/538,388, filed on Jan. 21, 2004.

(51) Int. Cl.
| | |
|---|---|
| G06F 17/50 | (2006.01) |
| G06F 7/60 | (2006.01) |
| G06G 7/68 | (2006.01) |
| G01N 11/00 | (2006.01) |
| G01V 1/34 | (2006.01) |
| G01V 1/28 | (2006.01) |
| E04B 9/02 | (2006.01) |

(52) U.S. Cl.
USPC ............ 703/1; 703/2; 703/7; 702/56; 702/14; 702/15; 52/167.1; 52/167.4

(58) Field of Classification Search
USPC .................................. 703/1; 702/34
See application file for complete search history.

(56) References Cited

U.S. PATENT DOCUMENTS

| | | | | | |
|---|---|---|---|---|---|
| 4,843,460 | A | * | 6/1989 | Le Guet et al. | 348/139 |
| 4,913,550 | A | * | 4/1990 | Montgomery et al. | 356/502 |
| 4,964,060 | A | * | 10/1990 | Hartsog | 703/1 |
| 5,036,633 | A | * | 8/1991 | Kobori et al. | 52/1 |
| 5,163,015 | A | * | 11/1992 | Yokota | 703/7 |
| 5,576,971 | A | * | 11/1996 | Ishii et al. | 702/15 |
| 5,663,501 | A | | 9/1997 | Nakamura et al. | |
| 5,737,239 | A | * | 4/1998 | Horiuchi et al. | 702/56 |
| 5,842,148 | A | * | 11/1998 | Prendergast et al. | 702/34 |
| 5,851,446 | A | * | 12/1998 | Bardo et al. | 52/712 |

(Continued)

FOREIGN PATENT DOCUMENTS

WO    WO 02/13071    2/2002

OTHER PUBLICATIONS

"Health and performance evaluation using real-time hysteretic behavior" by W.D. Ivan, published in Proceeding of First International Conference on Structural Health Monitoring and Intelligent Infrastructure, Nov. 13-15, 2003, Tokyo Japan. ISBN: 9058096475.*

(Continued)

Primary Examiner — Akash Saxena
(74) Attorney, Agent, or Firm — Gates & Cooper LLP (57) ABSTRACT

Extreme event performance evaluation using real-time hysteresis monitoring. A structure is monitored using one or more sensors. One or more inter-story Hysteresis Loops for the structure are generated in real-time using data from the sensors, thus enabling rapid decision making regarding the structure's condition.

24 Claims, 9 Drawing Sheets

(56) References Cited

U.S. PATENT DOCUMENTS

| | | | |
|---|---|---|---|
| 5,984,062 A * | 11/1999 | Bobrow et al. | 188/378 |
| 6,237,292 B1 * | 5/2001 | Hegemier et al. | 52/273 |
| 6,425,157 B1 * | 7/2002 | Ouchi et al. | 703/1 |
| 6,543,077 B2 * | 4/2003 | Ouchi et al. | 703/1 |
| 6,629,042 B2 * | 9/2003 | Yamagishi et al. | 702/42 |
| 6,792,720 B2 * | 9/2004 | Hocking | 52/1 |
| 6,862,848 B1 * | 3/2005 | Lang et al. | 52/167.1 |
| 6,966,154 B1 * | 11/2005 | Bierwirth | 52/167.4 |
| 7,069,158 B2 * | 6/2006 | Gidwani | 702/56 |
| 7,346,432 B2 * | 3/2008 | Matsumiya et al. | 700/275 |
| 2001/0030609 A1 * | 10/2001 | Sen et al. | 340/679 |
| 2002/0059034 A1 * | 5/2002 | Inoue et al. | 702/56 |
| 2002/0095275 A1 * | 7/2002 | Anzai et al. | 703/1 |
| 2005/0013526 A1 * | 1/2005 | Lee et al. | 385/13 |
| 2005/0114105 A1 * | 5/2005 | Barber | 703/2 |
| 2008/0236294 A1 * | 10/2008 | Woo | 73/800 |
| 2011/0054840 A1 * | 3/2011 | Hively et al. | 702/42 |
| 2011/0154903 A1 * | 6/2011 | Finkel et al. | 73/598 |
| 2012/0019307 A1 * | 1/2012 | Ludwig | 327/407 |
| 2012/0310607 A1 * | 12/2012 | Liu | 703/1 |

OTHER PUBLICATIONS

"Evaluation of proper supplemental damping for a multi-story steel frame using capacity spectrum method" by Choi, H. H.', Kim, (Choi hereafter) J.' Dept. of Architectural Engineering, Sunghynkwan University, Korea, 1999. pp. 1-10.*

"Evaluation of seismic performance of multistory building structures based on the equivalent responses" by Dong-Guen Lee et al, Dec. 9, 2005, Engineering Structures 28 (2006) pp. 837-856.*

Cifuentes et al., "On the Modeling of a Class of Deteriorating Structures Subjected to Severe Earthquake Loading," Proceedings 3rd U.S. National Conference on Earthquake Engineering, Charleston, North Carolina, pp. 967-978, Aug. 1986.

Cifuentes et al., "Nonlinear System Identification Based on Modeling of Restoring Force Behavior," Journal of Soil Dynamics and Earthquake Engineering, 8, n. 1, pp. 2-8, Jan. 1989.

Iemura et al., "Hysteretic Response of a Nine-Story Reinforced Concrete Building," International Journal of Earthquake Engineering and Structural Dynamics, 3, pp. 183-201, 1974.

Iwan, "Earthquake Warning System Could Help Lessen Damage," The Los Angeles Times, Jun. 29, 1979.

Iwan, "California's San Andreas Fault—New System Might Give Residents and Industry Up to a Minute's Notice of a Major Quake," The Christian Science Monitor, Jun. 6, 1979.

Iwan et al., "A Model for System Identification of Degrading Structures," Journal of Earthquake Engineering and Structural Dynamics, 14, pp. 877-890, 1986.

Iwan, Wilfred D.; "R-SHAPE: A Real-Time Structural Health and Performance Evaluation System," Proceedings of the US-Europe Workshop on Sensors and Smart Structures Technology, Apr. 2002, pp. 33-38.

* cited by examiner

EXTREME EVENT PERFORMANCE EVALUATION USING REAL-TIME HYSTERESIS MONITORING

CROSS-REFERENCE TO RELATED APPLICATION

This application is related to the following commonly-assigned application:

U.S. Provisional Application Ser. No. 60/538,388, filed Jan. 21, 2004, by Wilfred D. Iwan, entitled "R-SHAPE," which application is incorporated by reference herein.

BACKGROUND OF THE INVENTION

1. Field of the Invention

This invention is related to extreme event performance evaluation using real-time hysteresis monitoring.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The hysteretic behavior of a structure plays a crucial role in many current approaches to seismic performance-based analysis and design. Most structural engineers can fairly accurately assess the performance of a structure and its level of damage following an earthquake or other extreme event if the nature of its inter-story force-deformation of Hysteresis Loop behavior is known.

What is needed is the ability to generate inter-story Hysteresis Loops for structural systems in real time during an extreme event thus enabling rapid decision making regarding structural condition. The present invention satisfies that need. The present invention comprises a system that provides continuous real-time monitoring of inter-story hysteretic behavior and other useful information. Using such a system, it is possible to provide automated decision support for use by building owners and managers, even though they lack specific technical knowledge of building performance.

SUMMARY OF THE INVENTION

The invention discloses an apparatus, method and article of manufacture for extreme event performance evaluation using real-time hysteresis monitoring, comprising one or more sensors for monitoring a structure, and one or more computers, coupled to the sensors, for accepting data from the sensors and for generating one or more inter-story Hysteresis Loops for the structure in real-time using the data, thus enabling rapid decision making regarding the structure's condition.

The Hysteresis Loops solve for a restoring force between $j^{th}$ and $(j-1)^{th}$ floors of the structure according to:

$$f_j(y_j - y_{j-1}) = -\sum_{i=j}^{N} m_i \ddot{y}_i$$

where:

N is a number of discrete floor masses that are interconnected by a lateral load resisting structural system in the structure, $m_i$ are floor masses, $y_i$ is an absolute displacement of a $j^{th}$ floor mass, $y_{j-1}$ is an absolute displacement of a $j^{th}-1$ floor mass, a(t) is an absolute excitation acceleration, $\ddot{y}_0 = a(t)$, $\ddot{y}(t)$ is a response acceleration, $f_{N+1} = 0$, and $m_i \ddot{y}_i + f_i(y_i - y_{i-1}) - f_{i+1}(y_{i+1} - y_i) = 0$ is an equation of motion for an $i^{th}$ floor mass.

The data comprises acceleration data obtained at each floor level of the structure. As a result, the computer displays the Hysteresis Loop between any two selected floor levels. Moreover, the computer displays streaming floor displacements, velocities, or accelerations.

The data is fed to a local recorder for recording in a data log. Moreover, the data may be used to trigger pre-event, post-event or voting notifications. In addition, the data may be used to generate output from a data broadcast process, which includes a publish/subscribe interface.

In one embodiment, a first one of the computers comprises a real-time monitoring system and a second one of the computers comprises a remote client that monitors the data received from the real-time monitoring system and calculates the inter-story Hysteresis Loops.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced.

It is to be understood that other embodiments may be utilized and structural changes may be made without departing from the scope of the present invention.

1 Introduction

The Capacity Spectrum Method (CSM) has become a popular tool for seismic design and analysis within the context of Performance Based Engineering. One reason for this popularity is the intuitive nature of the assumptions behind the method. In the CSM, the Performance Point is defined as that point in an acceleration-displacement or force-displacement space that represents equality of the Demand and the Capacity of the structure. The Capacity is specified by the backbone curve of the representative cyclic force-deflection diagram or Hysteresis Loop of the structure. The Hysteresis Loop and associated Backbone Curve may be specified analytically, derived from laboratory tests of structural components, or generated numerically from a computer model of the structure. Based on the steadily increasing use of the Capacity Spectrum in structural design and analysis, it is evident that the hysteretic behavior of a structure plays a crucial role in understanding and analyzing its performance.

The present invention discusses the use of Hysteresis Loop behavior to make decisions about the performance and condition of building structures subjected to extreme events. Although generally recognized as a useful indicator of structural condition and performance, until recently, computation of the Hysteresis Loop behavior took considerable time due to the need to post-process recorded building response data. This restricted the usefulness of the information from a decision making perspective. With current technology, it is possible to generate Hysteresis Loops for structural systems continuously in real-time, thus enabling rapid decision making regarding structural condition and performance.

The present invention comprises a real-time Hysteresis Loop generator that is part of an analysis package developed for the Real-Time Structural Health and Performance Evaluation (R-SHAPE) system is herein described. This system provides at least 36 channels of streaming real-time response data via the Internet. Possible extensions and applications of the R-SHAPE technology and Hysteresis Loop monitoring are further discussed below.

2 Hysteresis Loops as an Indicator of Structural Performance

The basic concepts underlying Hysteresis Loop identification from experimental data are summarized below, and examples are given of application to structural analysis and decision making.

2.1 Basic Concepts—SDOF Systems

Consider a simple single-degree-of-freedom (SDOF) structure (or a single mode of a more complex structure). Assume the absolute excitation acceleration, $a(t)$, and response acceleration, $\ddot{y}(t)$, have been measured using accelerometers and that the data are available for analysis. The SDOF system can be represented by the simple mathematical model:

$$\ddot{x} + f(x,\dot{x})/m = -a(t) \tag{1}$$

where $x(t)$ is the relative response displacement, $\dot{x}(t)$ is the first derivative of $x(t)$ (the velocity), $\ddot{x}(t)$ is the second derivative of $x(t)$ (the acceleration), and $f(x,\dot{x})|m$ is a mass-normalized restoring force. Rewriting Equation (1) yields:

$$f(x,\dot{x})/m = -[a(t) + \ddot{x}(t)] = -\ddot{y}(t) \tag{2}$$

where $x(t)$ can be obtained from the measured data for accelerations $a(t)$ and $\ddot{y}(t)$ by subtraction and double integration. In this way, the mass-normalized restoring force can be graphed as a function of x with time as a parameter. This gives the Hysteresis Loop of the structure for the given excitation $a(t)$. This simple approach was employed by Iemura and Jennings (1974) [3] in an early study of the Millikan Library Building on the Caltech campus. It can provide considerable insight into the behavior of a structure during an extreme event.

The basic approach outlined above was employed by Iwan and Cifuentes (1986) [6] to study the performance of the Bank of California Building during the San Fernando earthquake of 1971 and the Imperial Count Services Building during the 1979 Imperial County earthquake. Filtering was used to isolate the first mode response of the structure. When such filtering is employed, great caution must be exercised so as not to introduce phase shifts into the data.

Figure 1:
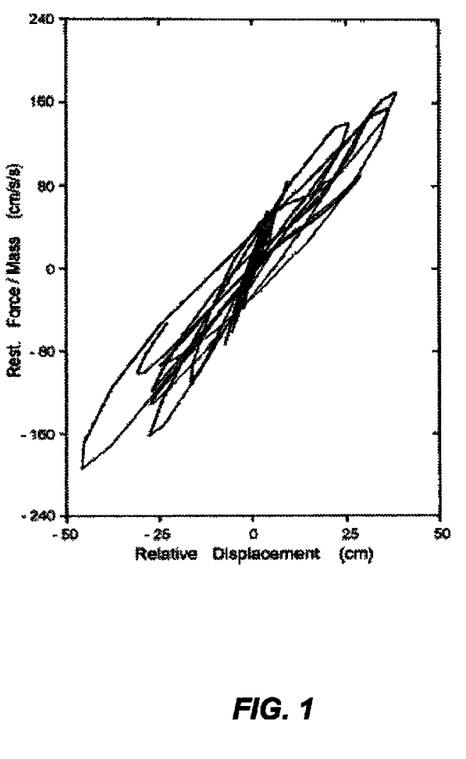
FIG. 1 is a graph that illustrates measured Hysteresis Loops from the Bank of California Building during 1971 San Fernando Earthquake.

FIG. 1 shows the hysteretic behavior of the Bank of California Building, a 12-story reinforced concrete moment-resisting frame structure that suffered noticeable cracking and spalling of the girder and column stubs but showed no signs of potential structural instability. As seen from the figure, the Hysteresis Loops show considerable stiffness reduction during the course of the earthquake, but are very regular and stable. This type of hysteretic behavior is typical of structures that have undergone significant loading into the inelastic range of response but are not heavily damaged. In many cases, the stiffness of the structure actually recovers when the earthquake excitation subsides.

Figure 2:
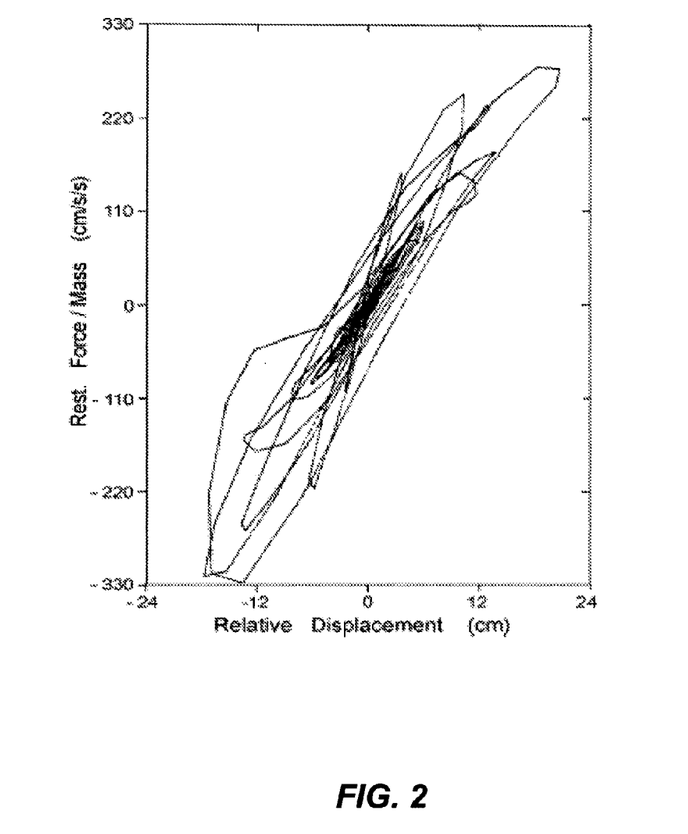
FIG. 2 is a graph that illustrates measured Hysteresis Loops from the Imperial County Services Building during the 1979 Imperial County Earthquake.

By contrast, FIG. 2 shows Hysteresis Loops obtained from the Imperial County Services Building. This 6-story reinforced concrete frame and shear wall structure suffered extensive damage during the Imperial County earthquake of 1979 and was eventually demolished (Kreger and Sozen, 1983 [7]). In addition to considerable softening behavior, it is seen that the Hysteresis Loops show an unusual "bulge" at about the time partial collapse occurred in four columns at the east end of the building.

The bulge is associated with a sudden drop in load carrying capacity of the structure with little change in relative displacement. This is a clear indicator that there has been significant damage to the horizontal (and possibly the vertical) load carrying system of the building.

The two examples given above illustrate how knowledge of the Hysteresis Loop behavior can be used as a rapid visual indicator of system performance. The information contained in the Hysteresis Loop may also be used as a starting point for carrying out further analysis leading to improved decision making.

2.2 The Hysteresis Loop as a Starting Point for Further Analysis

Once the cyclic Hysteresis Loop behavior has been determined from data, additional analysis can be undertaken to further examine the performance of a structure. One form of analysis is to follow the locus of the Secant Stiffness associated with each Hysteresis Loop as the building responds to the excitation and then vibrates back to a quiescent state. The Secant Stiffness is defined as the slope of the Hysteresis Loop from its origin to a point where the displacement is a maximum (zero velocity). The Secant Stiffness can be quickly calculated once the nested cyclic Hysteresis Loops have been determined.

Figure 3:
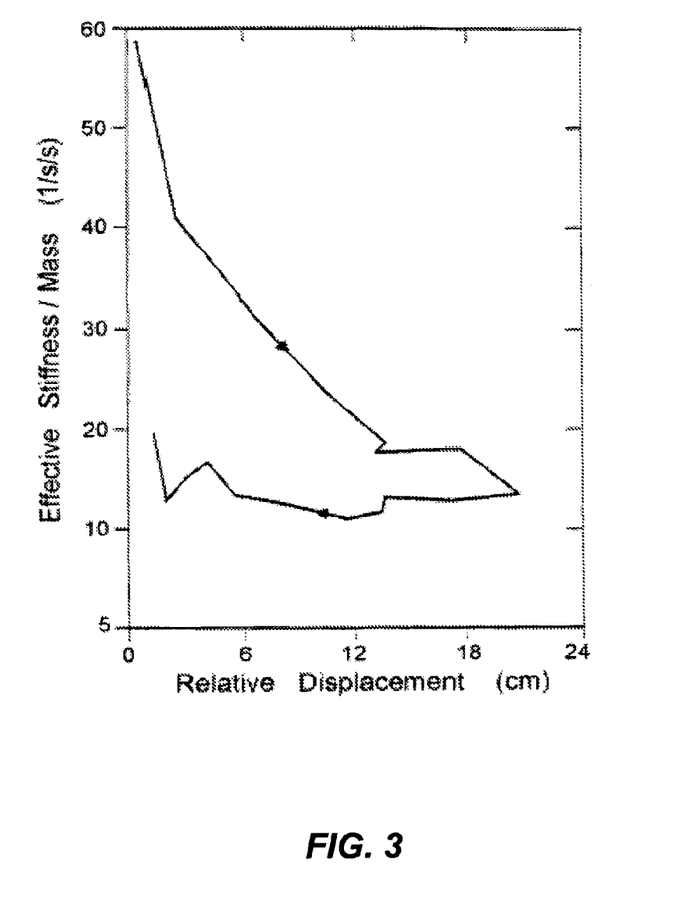
FIG. 3 is a graph that illustrates the locus of secant stiffness for the Imperial County Services Building during the 1979 Imperial County Earthquake.

FIG. 3 shows the locus of the Secant Stiffness for the Imperial County Services Building derived from the data in FIG. 2. It is seen that there is a very rapid drop in effective stiffness of this building to about 25% of its initial stiffness. Furthermore, this stiffness shows very little recovery following the strong ground shaking. This is a clear indicator of potentially significant damage to the structure.

2.3 Hysteresis Loop Information as a Tool for Decision Making

The Morgan Hill earthquake of Apr. 24, 1984 caused damage to numerous structures in and around San Jose, Calif. Some of these structures housed vital corporate activities. Unfortunately, most of the buildings were not instrumented. However, one important building was, and the recorded accelerograms were used to generate the hysteretic behavior of the building as outlined above.

Figure 4:
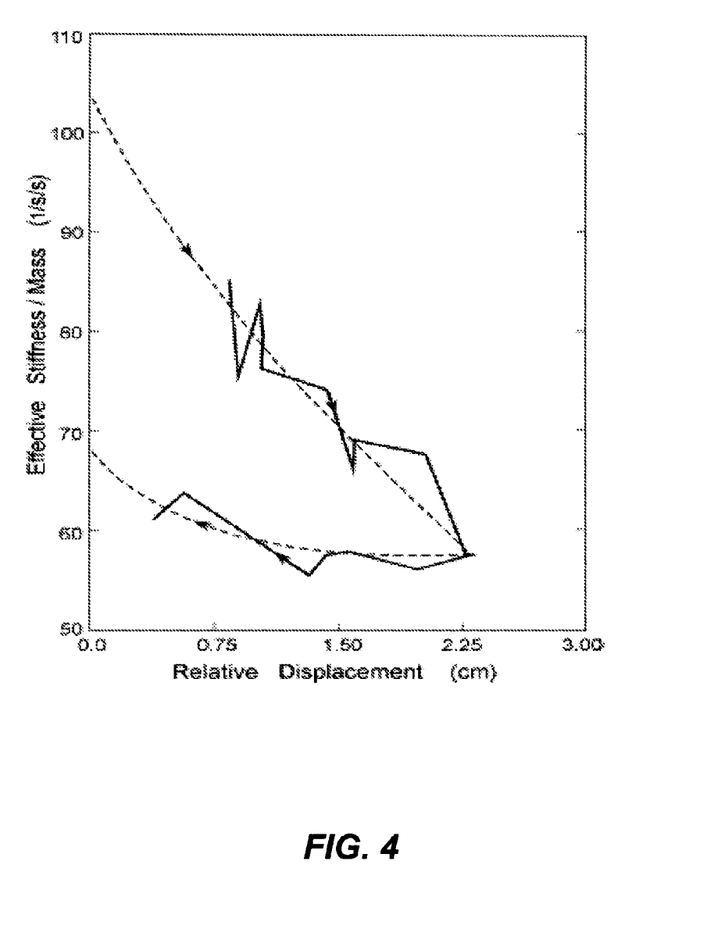
FIG. 4 is a graph that illustrates the locus of secant stiffness for an unspecified San Jose office building during the 1984 Morgan Hill Earthquake.

The locus of effective Secant Stiffness for this structure is shown in FIG. 4. It was estimated that the structure lost about 45% of its stiffness during the earthquake and a relatively small portion of this stiffness was recovered after the event. Although not as severe as in the case of the Imperial County Services Building, this figure indicates a significant reduction in load carrying capacity of the structure.

Based on the behavior of the locus of Secant Stiffness, a simple analytical hysteretic model was constructed for the building (Cifuentes and Iwan, 1986 [1] and 1989 [2]). This model was then used to predict the response of the building to a postulated future earthquake of different levels of severity. The excitations used in the analysis were actual ground motions recorded at the same site or at nearby sites during the same Morgan Hill earthquake.

Figure 5:
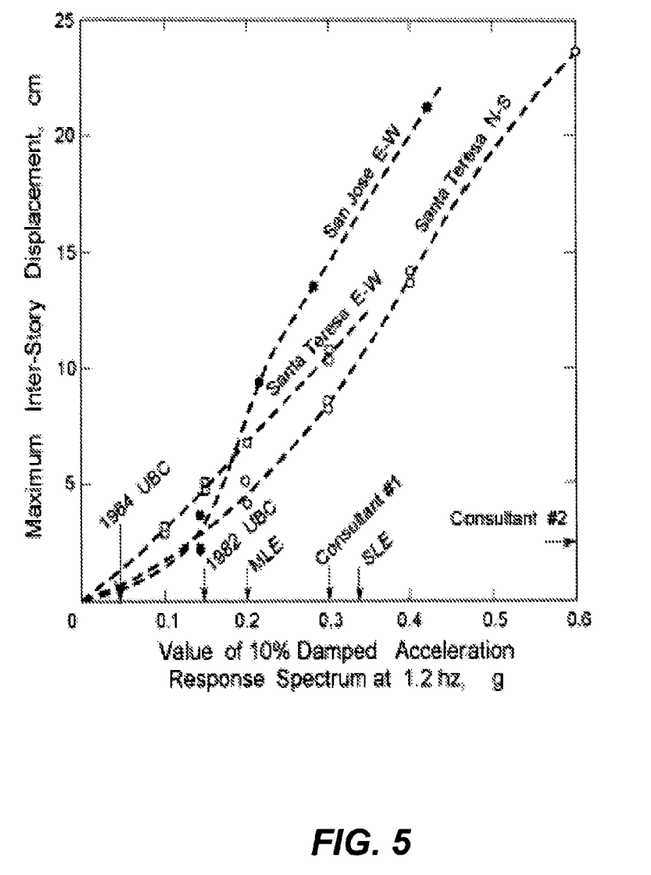
FIG. 5 is a graph that illustrates the predicted maximum displacement response as a function of excitation level for various recorded nearby ground motions, including design ground motion levels for the building, for an unspecified San Jose office building during the 1984 Morgan Hill Earthquake.

A sample result is shown in FIG. 5. The performance prediction that was made using the hysteresis loop behavior indicated the possibility of potentially catastrophic structural displacements for earthquakes within the intended design range of the building. After subsequent detailed structural analysis, it was determined that the risk associated with these levels of displacement and the associated structural damage was unacceptable and the building was abandoned.

This is believed to be one of the earliest examples of a real business decision that was based in part on information provided by the Hysteresis Loop behavior of a building during an extreme event.

3 Inter-Story Hysteresis Loop Generation for MDOF Systems

The simple concepts described above for SDOF systems can readily be extended to multiple-degree-of-freedom (MDOF) systems. As an illustration, consider a building with N discrete floor masses that are interconnected by a lateral load resisting structural system. Let the floor masses be specified as $m_i$ and let the inter-story restoring forces be represented as $f_i(y_i - y_{i-1})$ where $y_i$ is the absolute displacement of the $i^{th}$ floor mass. Then, the equation of motion for the $i^{th}$ floor mass will be:

$$m_i \ddot{y}_i + f_i(y_i - y_{i-1}) - f_{i+1}(y_{i+1} - y_i) = 0 \quad (3)$$

where $y_0 = a(t)$ and $f_{N+1} = 0$. Solving for the restoring force between the $j^{th}$ and $(j-1)^{th}$ floors yields:

$$f_j(y_j - y_{j-1}) = -\sum_{i=j}^{N} m_i \ddot{y}_i. \quad (4)$$

Equation (4) can be used to generate inter-story Hysteresis Loops from acceleration data obtained at each floor level. By analyzing these loops, it is possible to observe the nature and degree of softening and deterioration, and to compare this to the design objectives for the structural elements.

As a first step in analysis, the hysteretic behavior can be classified as either stable, stiffness degrading, or strength degrading. Also, any unusual features of the restoring force can be noted for subsequent more thorough study. Additionally, a simplified lumped-mass structural model that fits the observed inter-story hysteretic behavior could be constructed for further detailed analysis.

4 Real-Time Implementation

Using existing technology, all of the steps outlined above for determining inter-story Hysteresis Loops can be implemented in real time. Continuous real-time structural condition and performance monitoring has many advantages over post-processed monitoring. First, real-time monitoring provides a basis for rapid decision making under adverse conditions. There is increasing demand for very quick response to natural disasters such as extreme winds and earthquakes as well as man made disasters such as terrorist attacks and technological accidents. In order to be most effective, this response often needs to be initiated at the height of the crisis. Real-time performance evaluation can help to insure that decisions are based on both accurate and timely information.

A second motivation for continuous real-time monitoring of structural condition and performance is that it can result in increased public awareness, understanding, and acceptance of the importance of structural health. Public support has always been a vital factor in the development of improved systems and technologies.

Real-time earthquake monitoring and warning systems for urban regions were proposed for seismically active regions of the United States in 1979 (Iwan, 1979 [4,5]). However, it was not until the early 1990's that such systems actually began to be deployed for ground motion monitoring. This resulted in the development of innovative and useful tools for earthquake detection and emergency response. One such tool in the United States is the SHAKEMAP software that provides rapid mapping of the distribution of ground shaking from an earthquake event and is used by emergency response agencies to assist in the deployment of scarce resources.

Today, real-time monitoring of structural systems is a reality. This was first demonstrated in early 2002 for the Millikan Library Building on the Caltech campus. This system was called R-SHAPE for Real-Time Structural Health and Performance Evaluation. The system was the result of a joint effort by Caltech, the U.S. Geological Survey (USGS), and Digitexx Data Systems, Inc. It is based on current sensor technology, but provides an excellent test bed for new sensor and analysis software development, as well as for the design and application of decision-making tools.

Figure 6:
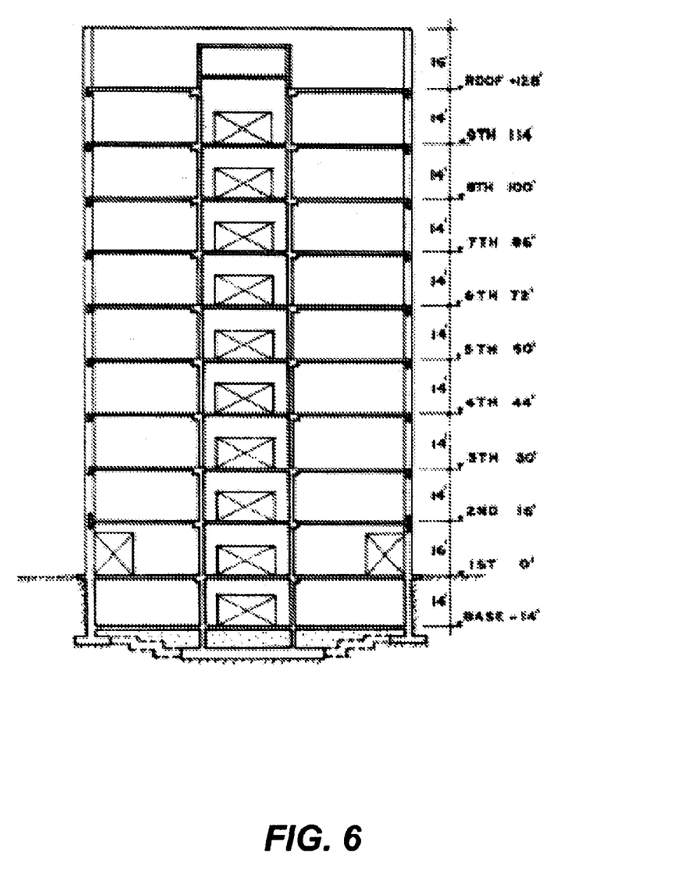
FIG. 6 is an elevation view of the Millikan Library Building showing its central core and frame.

The Millikan Library Building is a 9-story reinforced concrete frame building. It consists of a boxlike inner core structure that contains elevators and utilities surrounded by a frame structure. An elevation view is shown in FIG. 6.

The Millikan Library building has been well instrumented since its construction and has recorded motions during every major Southern California earthquake starting with the destructive San Fernando earthquake of 1971. It has been extensively modeled and studied by researchers worldwide. The building is also routinely shaken by a rotating eccentric mass exciter located on its roof. The dynamic properties of the building are widely known and well understood.

The building monitoring system is built upon a commercially available installation of the type used by the USGS and the California Geological Survey to instrument structures throughout California and elsewhere in United States. At present, there are 36 channels of Forced Balance Accelerometer (FBA) data fed to a triggered recorder that locally records all events exceeding a specified level. Each floor has at least two uniaxial accelerometers oriented in the N-S or E-W directions.

4.1 An Operational System for Real-Time Health and Performance Evaluation

Figure 7:
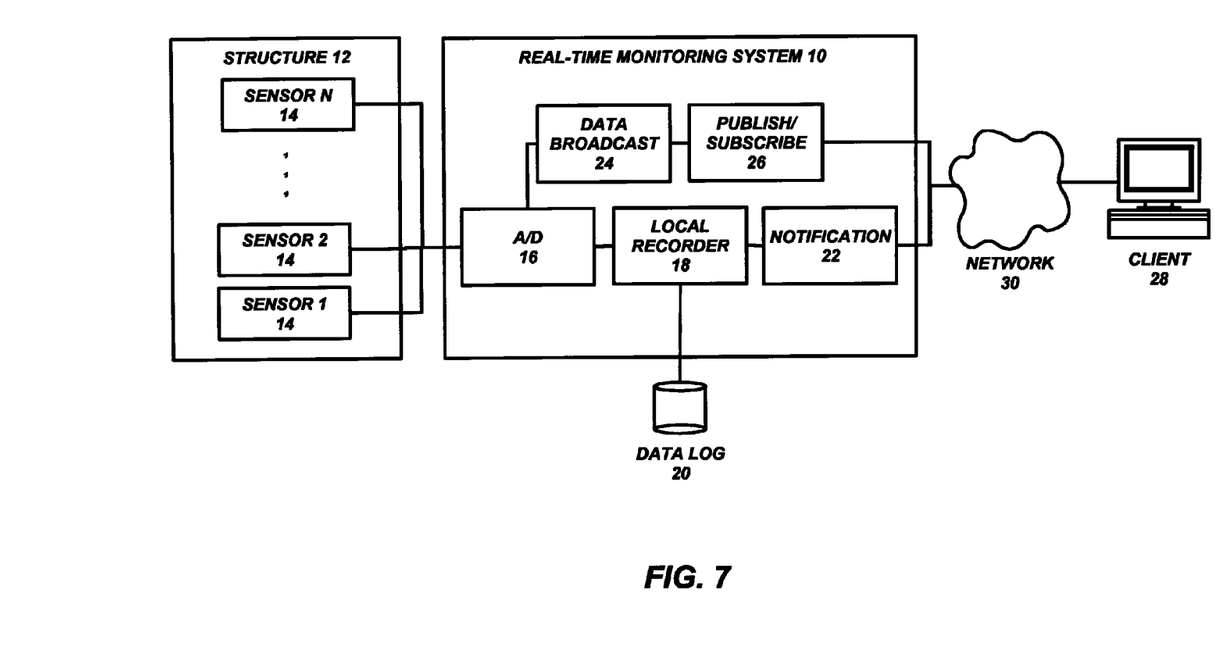
FIG. 7 is a block diagram illustrating the components of the real-time monitoring system and the logic performed thereby according to the preferred embodiment of the present invention.

FIG. 7 is a block diagram illustrating the components for extreme event performance evaluation using real-time hysteresis monitoring, and the logic performed thereby, according to the preferred embodiment of the present invention. Specifically, the figure illustrates one or more sensors for monitoring a structure, and one or more computers, coupled to the sensors, for accepting data from the sensors and for generating one or more inter-story Hysteresis Loops for the structure in real-time using the data, thus enabling rapid decision making regarding the structure's condition.

A real-time monitoring system 10 comprises a multi-channel (e.g., 24, 32, 64 channel) real-time data acquisition and analysis system, with manual and event driven triggering. The system 10 accepts input from 1–N sensors 12 monitoring a structure 14, wherein the sensors 12 comprise uniaxial force balanced accelerometers (FBAs). An Analog-to-Digital (A/D) conversion process 16 is performed on the signals received from the sensors 12 to generate digital data for processing by the system 10, wherein the digital data is fed to a local recorder 18 for recording in a data log 20. The digital data may trigger pre-event, post-event or voting notifications 22, and may be used to generate output from a data broadcast process 24, which includes a publish/subscribe interface 26. The notifications 22 and the output of the publish/subscribe interface 26 may be transmitted to remote clients 28 across a network 30 as desired.

A remote client 28 comprises an analysis system that monitors the data received from the real-time monitoring system 10 and computes performance and condition indicators in a streaming mode. In this regard, the data received from the real-time monitoring system 10 comprises acceleration data obtained at each floor level of the structure 14.

The remote client 28 performs real-time Hysteresis Loop calculation, wherein the Hysteresis Loops solve for a restoring force between $j^{th}$ and $(j-1)^{th}$ floors of the structure 14 according to:

$$f_j(y_j - y_{j-1}) = -\sum_{i=j}^{N} m_i \ddot{y}_i$$

where:

N is a number of discrete floor masses that are interconnected by a lateral load resisting structural system in the structure 14, $m_i$ are floor masses, $y_j$ is an absolute displacement of a $j^{th}$ floor mass, $y_{j-1}$ is an absolute displacement of a $j^{th}-1$ floor mass, a(t) is an absolute excitation acceleration, $\ddot{y}_0 = a(t)$, $\ddot{y}(t)$ is a response acceleration, $f_{N+1} = 0$, and $m_i \ddot{y}_i + f_i(y_i - y_{i-1}) - f_{i+1}(y_{i+1} - y_i) = 0$ is an equation of motion for an $i^{th}$ floor mass.

Other functions performed by the remote client 28 may include real-time Fast Fourier Transform (FFT), real-time response spectrum, real-time velocity and displacement, and remote data recording of all channels in real-time.

Figure 8:
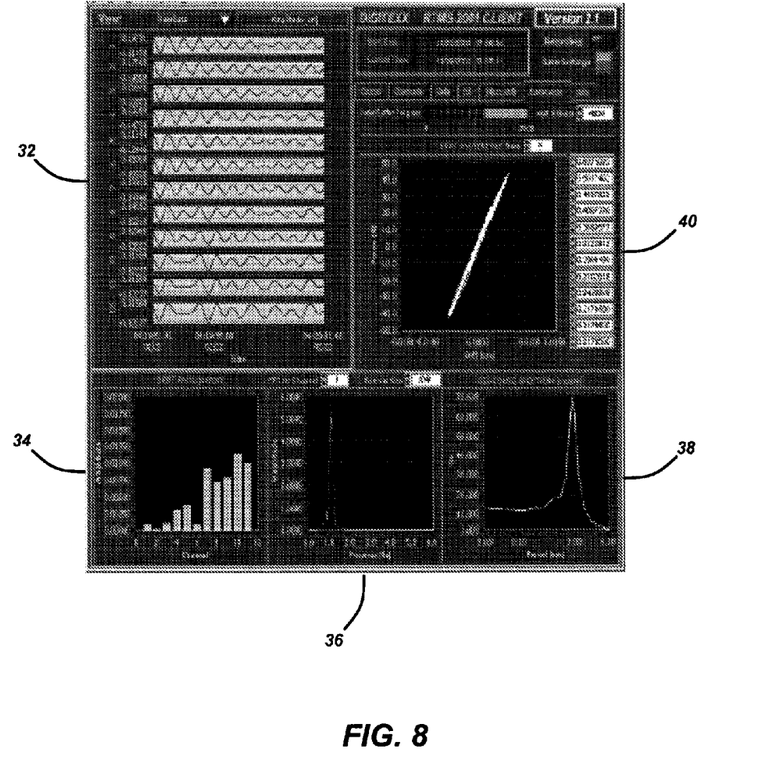
FIG. 8 illustrates the graphical user interface (GUI) of the R-SHAPE Analysis Software (Client) showing the Hysteresis Loop monitor and other features, wherein the image is generated from data generated by the Big Bear earthquake of Feb. 22, 2003.

FIG. 8 shows an example of the display generated by the remote client 28. The components of the display shown counterclockwise from upper left are: a window 32 showing streaming floor displacements, velocities, or accelerations for selected channels (shown here are displacements from the roof level down); a window 34 showing values of the inter-story drift ratio for selected combinations of floor levels; a window 36 showing the Fourier Amplitude Spectrum of any selected channel; a window 38 showing the Floor Response Spectrum for any selected channel; and a window 40 showing the Hysteresis Loop between any two selected floor levels.

This particular display was generated from data obtained during a ML 5.4 earthquake near Big Bear, Calif. on Feb. 22, 2003. The epicenter of the earthquake was about 120 km distant from the Caltech campus and the maximum ground acceleration at the Millikan Library was only about 0.01 g. This low level of excitation was certainly not sufficient to cause any structural damage. However, the response of the structure is clearly evident in the monitoring display.

In window 32, floor displacement time histories are shown from the roof (top) to the first floor (bottom). The basement channels were inoperable during this event due to remodeling in the building, so the first floor data is repeated three times at the bottom of the display.

In window 40, the Hysteresis Loop shown is for the second to third floor. The data was bandpass filtered with a Butterworth filter between 0.6 Hz to 1.4 Hz.

The Hysteresis Loop shown in window 40 is for relatively low amplitude of motion and the system appears to be essentially linear. There is very little hysteretic dissipation evident. The information contained in this low excitation illustration cannot be taken as representative of the response of the structure to extreme events. However, the figure does graphically illustrate the potential of the real-time monitoring system as a means of rapidly identifying structural behavior.

Inter-story Hysteresis Loops may be computed in real time as they occur from measured floor accelerations using Equation (4). Hysteresis Loops for all stories are available for viewing and may be analyzed using other software packages such as MATLAB. The client software can also be used to automatically sound an alarm if certain pre-defined inter-story drift or other response limits are exceeded. Bandpass filtering of the streaming data may also be specified to eliminate undesirable noise.

4.2 Interpretation of Hysteresis Loop Behavior

It is important to note that mere knowledge of the inter-story Hysteresis Loop behavior itself as defined in Equation (4) may not be adequate for decision making. In order to use this information appropriately, it is necessary to understand how the structural system of the building caries the loads transmitted to it by the earthquake ground motion.

In order to gain further understanding of load transmission, the data generated and stored by the system 10 may readily be used to determine the shape of the response in different modes of a structure. To illustrate this usage, data captured during a forced vibration test of the Millikan Library Building at its lowest natural frequency is used. The excitation was provided by a permanently installed roof-mounted rotary shaker system.

Figure 9:
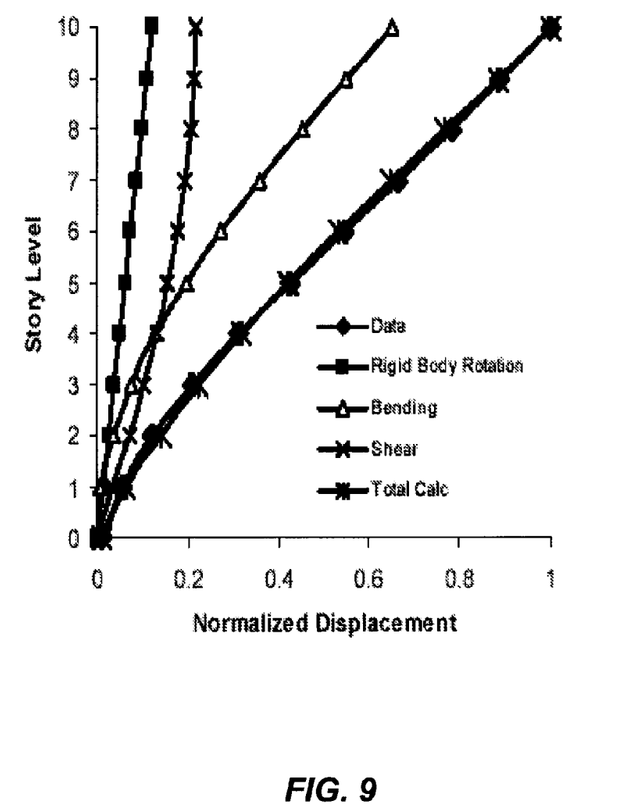
FIG. 9 is a graph that illustrates the shape of the first mode of the Millikan Library Building in the E-W direction as determined by the R-SHAPE client software during forced vibration testing at resonance.

Results for the E-W direction are shown in FIG. 9. The extreme right line with the diamond markers, labeled as "Total Calc," is the overall deflected shape as calculated form the raw data. However, this overall shape generally consists of several sub-components. Since the Millikan Library structural system contains both a central core and an outer frame, it may be modeled for conceptual purposes as a combined shear and bending structure with a possible rigid body foundation rotation. Assuming simple shear and bending component mode shapes and matching the drift ratio in the lowest and highest floor levels for the data and model gives a decomposition of the mode shape as shown in the figure.

It is observed that the overall mode shape consists of a rigid body foundation rotation component that accounts for about 12% of the total roof deflection, a shear component that accounts for about 23% of the total deflection, and a bending component that accounts for the remaining 65% of the total roof deflection.

The rigid body rotation causes no internal structural deformations and so should not be considered when looking for signs of structural distress. The shear component must be carried by both the central core and the surrounding frame. Thus, it must be considered in any analysis of these two structural elements. The bending deformation presumably arises primarily from the central box-like core of the building and is therefore important to understanding any distress to that portion of the structure. However, the frame will also see the bending deformations of the core so they must be taken into account in any analysis of this structural component as well.

This example shows that great care must be exercised in the interpretation of Hysteresis Loop information.

4.3 Potential Extensions and Applications

The real-time monitoring provided by the real-time monitoring system 10 and the Hysteresis Loop generation provided by the remote client 28 provides the basis for a wide range of possible extensions and applications. Some examples are indicated below:

1. The general shape of the Hysteresis Loops can be quickly examined as an indicator of the type of structural behavior exhibited and any unusual or unexpected features observed.

2. The effective Secant Stiffness can be computed and results similar to those of FIGS. 3 and 4 provided in near real time. These results could be used by engineers to determine the extent of degradation and potential damage at different floor levels within the structure.

3. The Backbone Curve of the Hysteresis Loops for each floor can be computed in near real time and compared to the Capacity curve used in a CSM or other type of design or analysis of the structure. This would enable the performance of the structure to be rapidly compared to its target performance.

4. Using pattern recognition technology, many of the above extensions could be automated so that simple performance indicators could be provided to building owners and managers very quickly after an extreme event without the need for detailed engineering analysis.

Rapid information on building performance and health following an extreme event is of vital importance to building owners and managers. This information can be used to determine whether or not a building needs to be evacuated, the best routes for evacuation, the likelihood of release of hazardous materials, and the probability of success of possible remedial actions, to mention only a few.

Building performance and condition information can also be used to make timely decisions about future operations for the functions housed in a building. This will enable building owners and managers to act more quickly in finding solutions to such important problems as critical data storage and retrieval, relocation of personnel and operations, temporary space needs, etc. Quick action can provide a competitive advantage for a building owner following a major event that affects a large number of buildings.

5 Summary

The Hysteresis Loop has been shown to be a valuable tool for structural performance analysis. It has been employed successfully to support important decisions regarding the safety of buildings subjected to extreme events such as earthquakes.

Continuous real-time monitoring of the response of buildings and other structures is now a reality, and this new technology can be used for real-time Hysteresis Loop monitoring as well as for other forms of health and performance evaluation. Such a system has been successfully implemented in the Millikan Library Building on the Caltech campus. This system can serve as a prototype for future systems employing even more sophisticated monitoring and analysis technology.

There are many potential benefits of real-time structural performance monitoring in support of decision making by building owners, emergency managers, responders, and engineers. These benefits will only be fully realized as the technology is more widely evaluated, implemented, and extended. The author believes that this technology will rapidly gain professional and public acceptance as the benefits are demonstrated.

6 References

The following references are incorporated by reference herein:

1. A. O. Cifuentes and W. D. Iwan, "On the Modeling of a Class of Deteriorating Structures Subjected to Severe Earthquake Loading," Proceedings 3rd U.S. National Conference on Earthquake Engineering, Charleston, N.C., pp. 967-978, August 1986.

2. A. O. Cifuentes and W. D. Iwan, "Nonlinear System Identification Based on Modeling of Restoring Force Behavior," Journal of Soil Dynamics and Earthquake Engineering, 8, n. 1, pp. 2-8, January 1989.

3. H. Iemura and P. C. Jennings, "Hysteretic Response of a Nine-Story Reinforced Concrete Building," International Journal of Earthquake Engineering and Structural Dynamics, 3, pp. 183-201, 1974.

4. W. D. Iwan, "Earthquake Warning System Could Help Lessen Damage," The Los Angeles Times, Jun. 29, 1979.

5. W. D. Iwan, "California's San Andreas Fault—New System Might Give Residents and Industry Up to a Minute's Notice of a Major Quake," The Christian Science Monitor, Jun. 6, 1979.

6. W. D. Iwan and A. O. Cifuentes, "A Model for System Identification of Degrading Structures," Journal of Earthquake Engineering and Structural Dynamics, 14, pp. 877-890, 1986.

7. M. Kreger and M. Sozen, "A Study of the Causes of Column Failures in the Imperial County Services Building During the 15 Oct. 1979, Imperial Valley Earthquake," University of Illinois Report UILU-ENG-83-2013, August 1983.

7 Conclusion

This concludes the description of the preferred embodiment of the present invention. The foregoing description of the preferred embodiment of the invention has been presented for the purposes of illustration and description. It is not intended to be exhaustive or to limit the invention to the precise form disclosed.

For example, FIG. 7 is merely an exemplary hardware and software environment used to implement the preferred embodiment of the invention. Those skilled in the art will recognize that any combination of the above components, or any number of different components, peripherals, and other devices, may be used with the invention.

Further, the exemplary hardware and software environment comprises logic and/or data embodied in or readable from a device, media or carrier. Consequently, the present invention may be implemented as an apparatus, method or article of manufacture for performing a method for extreme event performance evaluation using real-time hysteresis monitoring.

In another example, FIG. 8 is merely an exemplary graphical user interface (GUI) used to implement the preferred embodiment of the invention. Those skilled in the art will recognize that other graphical user interfaces may be used with the invention.

Many modifications and variations to the preferred embodiment are possible in light of the above teaching. Thus, it is intended that the scope of the invention be limited not by this detailed description, but rather by the claims appended hereto.

What is claimed is:

1. An apparatus for extreme event performance evaluation using real-time hysteresis monitoring, comprising:
one or more sensors for monitoring a structure in real-time during an extreme event; and
one or more computers, coupled to the sensors, for accepting data from the sensors and for generating one or more inter-story Hysteresis Loops for the structure in real-time during the extreme event using the data,
wherein the Hysteresis Loops solve for a restoring force between $j^{th}$ and $(j-1)^{th}$ floors of the structure according to:

$$f_j(y_j - y_{j-1}) = -\sum_{i=j}^{N} m_i \ddot{y}_i$$

where:
N is a number of discrete floor masses that are interconnected by a lateral load resisting structural system in the structure,
+$m_i$ are floor masses,
$y_j$ is an absolute displacement of a $j^{th}$ floor mass,
$y_{j-1}$ is an absolute displacement of a $j^{th}-1$ floor mass,
$a(t)$ is an absolute excitation acceleration,
$\ddot{y}_o = a(t)$,
$\ddot{y}(t)$ is a response acceleration,
$f_{N+1} = 0$, and
$m_i \ddot{y}_i + f_i(y_i - y_{i-1}) - f_{i+1}(y_{i+1} - y_i) = 0$ is an equation of motion for an $i^{th}$ floor mass; and
wherein at least one of the computers displays graphical representations of the inter-story Hysteresis Loops generated for the structure in real-time during the extreme event, so that a general shape of the Hysteresis Loops can be quickly examined as an indicator of structural behavior and for observing any unusual or unexpected features in the general shape of the Hysteresis Loops, thereby enabling rapid decision making regarding the structure's condition.

2. The apparatus of claim 1, wherein the computer displays the Hysteresis Loop between any two of the floors of the structure.

3. The apparatus of claim 1, wherein the computer displays streaming floor displacements, velocities, or accelerations.

4. The apparatus of claim 1, wherein the data is fed to a local recorder for recording in a data log.

5. The apparatus of claim 1, wherein the data triggers pre-event, post-event or voting notifications.

6. The apparatus of claim 1, wherein the data is used to generate output from a data broadcast process, which includes a publish/subscribe interface.

7. The apparatus of claim 1, wherein a first one of the computers comprises a real-time monitoring system and a second one of the computers comprises a remote client that monitors the data received from the real-time monitoring system and calculates the inter-story Hysteresis Loops.

8. The apparatus of claim 1, wherein the sensors comprise accelerometers that generate data comprising the absolute excitation acceleration and the response acceleration obtained at each floor of at least two floors of the structure.

9. A method for extreme event performance evaluation using real-time hysteresis monitoring, comprising:
monitoring a structure in real-time during an extreme event using one or more sensors;
generating, in one or more computers coupled to the sensors, one or more inter-story Hysteresis Loops for the structure in real-time during the extreme event using data from the sensors,
wherein the Hysteresis Loops solve for a restoring force between $j^{th}$ and $(j-1)^{th}$ floors of the structure according to:

$$f_j(y_j - y_{j-1}) = -\sum_{i=j}^{N} m_i \ddot{y}_i$$

where:
N is a number of discrete floor masses that are interconnected by a lateral load resisting structural system in the structure,
$m_i$ are floor masses,
$y_j$ is an absolute displacement of a $j^{th}$ floor mass,
$y_{j-1}$ is an absolute displacement of a $j^{th}-1$ floor mass,
$a(t)$ is an absolute excitation acceleration,
$\ddot{y}_o = a(t)$,
$\ddot{y}(t)$ is a response acceleration,
$f_{N+1} = 0$, and
$m_i \ddot{y}_i + f_i(y_i - y_{i-1}) - f_{i+}(y_{i+1} - y_i) = 0$ is an equation of motion for an $i^{th}$ floor mass; and
wherein at least one of the computers displays graphical representations of the inter-story Hysteresis Loops generated for the structure in real-time during the extreme event, so that a general shape of the Hysteresis Loops can be quickly examined as an indicator of structural behavior and for observing any unusual or unexpected features in the general shape of the Hysteresis Loops, thereby enabling rapid decision making regarding the structure's condition.

10. The method of claim 9, wherein the computer displays the Hysteresis Loop between any two of the floors of the structure.

11. The method of claim 9, wherein the computer displays streaming floor displacements, velocities, or accelerations.

12. The method of claim 9, wherein the data is fed to a local recorder for recording in a data log.

13. The method of claim 9, wherein the data triggers pre-event, post-event or voting notifications.

14. The method of claim 9, wherein the data is used to generate output from a data broadcast process, which includes a publish/subscribe interface.

15. The method of claim 9, wherein a first one of the computers comprises a real-time monitoring system and a second one of the computers comprises a remote client that monitors the data received from the real-time monitoring system and calculates the inter-story Hysteresis Loops.

16. The method of claim 9, wherein the sensors comprise accelerometers that generate data comprising the absolute excitation acceleration and the response acceleration obtained at each floor of at least two floors of the structure.

17. An article of manufacture comprising a non-transitory storage device embodying software that, when read and executed by one or more computers, result in the computers performing a method for extreme event performance evaluation using real-time hysteresis monitoring, the method comprising:

accepting data from one or more sensors monitoring a structure in real-time during an extreme event; and generating one or more inter-story Hysteresis Loops for the structure in real-time during the extreme event using the data accepted from sensors monitoring the structure, wherein the Hysteresis Loops solve for a restoring force between $j^{th}$ and $(j-1)^{th}$ floors of the structure according to:

$$f_j(y_j - y_{j-1}) = -\sum_{i=j}^{N} m_i \ddot{y}_i$$

where:

N is a number of discrete floor masses that are interconnected by a lateral load resisting structural system in the structure, $m_i$ are floor masses, $y_j$ is an absolute displacement of a $j^{th}$ floor mass, $y_{j-1}$ is an absolute displacement of a $j^{th}-1$ floor mass, $a(t)$ is an absolute excitation acceleration, $\ddot{y}_o = a(t)$, $\ddot{y}(t)$ is a response acceleration, $f_{N+1} = 0$, and $m_i \ddot{y}_i + f_i(y_i - y_{i-1}) - f_{i+}(y_{i+1} - y_i) = 0$ is an equation of motion for an $i^{th}$ floor mass; and wherein at least one of the computers displays graphical representations of the inter-story Hysteresis Loops generated for the structure in real-time during the extreme event, so that a general shape of the Hysteresis Loops can be quickly examined as an indicator of structural behavior and for observing any unusual or unexpected features in the general shape of the Hysteresis Loops, thereby enabling rapid decision making regarding the structure's condition.

18. The article of claim 17, wherein the computer displays the Hysteresis Loop between any two of the floors of the structure.

19. The article of claim 17, wherein the computer displays streaming floor displacements, velocities, or accelerations.

20. The article of claim 17, wherein the data is fed to a local recorder for recording in a data log.

21. The article of claim 17, wherein the data triggers pre-event, post-event or voting notifications.

22. The article of claim 17, wherein the data is used to generate output from a data broadcast process, which includes a publish/subscribe interface.

23. The article of claim 17, wherein a first one of the computers comprises a real-time monitoring system and a second one of the computers comprises a remote client that monitors the data received from the real-time monitoring system and calculates the inter-story Hysteresis Loops.

24. The article of claim 17 wherein the sensors comprise accelerometers that generate data comprising the absolute excitation acceleration and the response acceleration obtained at each floor of at least two floors of the structure.

* * * * *